Patented Mar. 30, 1926.

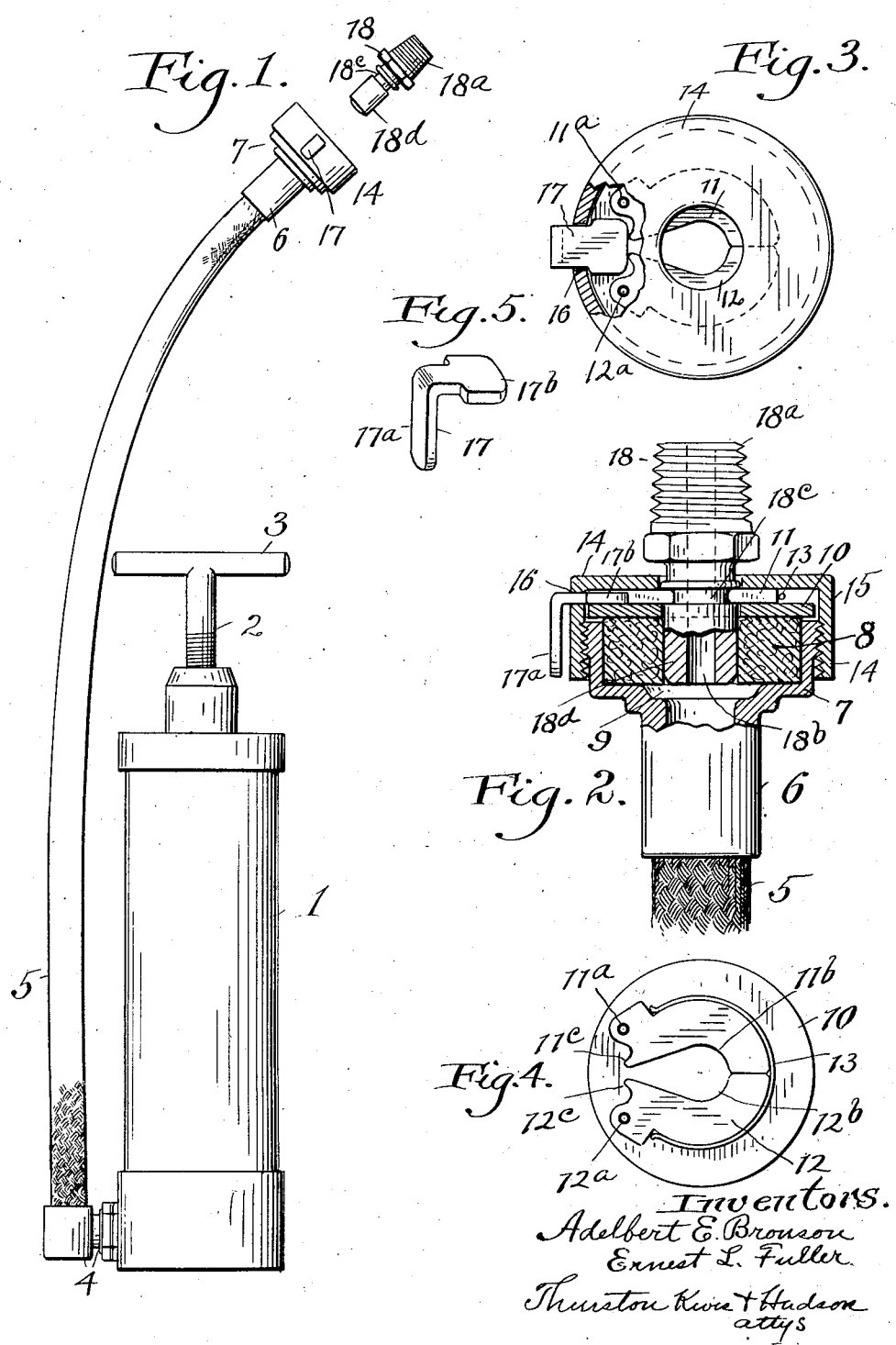

1,578,504

UNITED STATES PATENT OFFICE.

ADELBERT E. BRONSON AND ERNEST L. FULLER, OF CLEVELAND, OHIO, ASSIGNORS TO THE DILL MANUFACTURING COMPANY, OF CLEVELAND, OHIO, A CORPORATION OF OHIO.

COUPLING.

Application filed January 7, 1921. Serial No. 435,725.

*To all whom it may concern:*

Be it known that we, ADELBERT E. BRONSON and ERNEST L. FULLER, citizens of the United States, and residents of Cleveland, in the county of Cuyahoga and State of Ohio, have invented a certain new and useful Improvement in Couplings, of which the following is a full, clear, and exact description.

The present invention relates to a coupling device by which two cooperating members may be readily attached or detached from each other.

The invention described is particularly useful although not necessarily limited for use in connection with the flexible conduit of a so called grease gun by which lubricant may be applied to a bearing.

Reference should be had to the accompanying drawings forming a part of this specification in which Fig. 1 is an elevation of a grease gun having the invention applied thereto and a cooperating lubricant receiving device; Fig. 2 is a sectional elevation of a portion of the coupling device and conduit, certain portions being in section; Fig. 3 is a top plan view of the coupling with certain portions in section; Fig. 4 is a top plan view of the coupling with the top of the surrounding casing removed; Fig. 5 is a perspective view showing the manipulator by which the jaws are moved.

In the following specification the description of the invention will be given with particular reference to its application for use with a grease gun for use in connection with lubricant receiving devices which are mounted upon a machine adjacent the bearings thereof so that lubricant may be forced from the gun to the various bearings.

This particular use to which the coupling is applied is however but explanatory of its general use and it may be employed for other uses where performing similar functions.

Referring to the drawings, 1 indicates a casing which is hollow and is adapted to contain a charge of lubricating material such as grease and for the purpose of expelling grease from the casing 1 when desired there is a suitable device within the casing 1 (which devices are well known in the art) and this device is operated by means of a screw 2 which is turned by the handle 3. the outlet from the casing 1 is at the bottom thereof and in the present instance the outlet comprises a swivel connection 4 which in turn communicates with a flexible conduit 5. By virtue of the swivel connection 4 and the flexible conduit 5 it is possible to reach bearings in any given mechanism which are more or less inaccessible to lubricating devices which are rigid and not flexible.

At the end of the flexible conduit 5 there is a collar 6 which is secured at the end of the conduit 5, this collar carrying a cup-shaped member 7 with the interior of which it communicates. Within the cup-shaped member is a packing 8 that is provided with a central opening 9. This packing substantially fills the cup as indicated in the drawing. Above the packing is a plate 10 which has a central opening which is substantially coincident with the opening 9 in the washer 8. Resting on top of the plate 10 are two pivoted jaw members 11 and 12, each jaw member being pivoted upon the plate 10 as indicated at 11$^a$ and 12$^a$. These jaw members are recessed as indicated at 11$^b$ and 12$^b$ so that when they come together there is a centrally disposed opening which is slightly smaller than the opening through the plate 10, but is in alignment therewith.

The jaws 11 and 12 have portions which extend inwardly or toward each other from their pivoted points 11$^a$ and 12$^a$ and these portions terminate in projections such as indicated at 11$^c$ and 12$^c$. These projections are spaced slightly apart from each other but are adjacent each other. It will be perfectly apparent by an inspection of Fig. 4 that if pressure be applied to the projections 11$^c$ and 12$^c$, it will cause the jaws 11 and 12 to rock about their pivotal points 11$^a$ and 12$^a$ so that they are spread apart.

Cooperating with portions of the periphery of each of the jaws 11 and 12 is a spring 13. This spring extends around and fits against circular or substantially circular portions of the jaws 11 and 12 and the inherent resiliency of the spring is such as to normally maintain the jaws 11 and 12 in closed position such as shown in Fig. 4 and if the jaws are spread apart and subsequently the force or device which may be used to spread them apart is removed, the spring 13 will move the jaws back into their closed position.

Cooperating with the cup shaped portion 7 is a cover 14 which has a depending side flange 15, this flange being threaded upon the interior thereof and cooperating with threads upon the exterior of the cup shaped portion 7.

As will be seen from the drawing, the plate 10 which carries the jaws 11 and 12 is centered and held in position by the depending flange of the cover 14.

There is an opening through the flange of the cover 14, which opening is indicated at 16 and through this opening there extends an operating member which is indicated generally at 17. This operating member has a portion 17ª which extends substantially parallel with the depending flange 15 and at the opposite end the member 7 is provided with an enlarged head 17ᵇ which lies above the plate 10 and in position to engage with the projections 11ᶜ and 12ᶜ. When the member 17 is pushed inwardly the head 17ᵇ engages with the projections 11ᶜ and 12ᶜ and expands the jaws 11 and 12. When pressure upon the member 17 is released, the pressure due to the spring 13 causes the jaws 11 and 12 to return to their initial condition.

The device which cooperates with the movable jaws 11 and 12 for the purpose of forming the complete coupling is indicated generally at 18. This device may be termed, where it is used in connection with a grease gun, a lubricant receiving device. One end of the device is threaded as indicated at 18ª and is adapted to be screwed into a threaded opening which communicates with a bearing. This device has a central duct or channel 18ᵇ which extends entirely through the same and intermediate its ends the device is provided with a recess or channel 18ᶜ which is of a width corresponding with the thickness of the jaws 11 and 12.

The diameter of the head of the device which is indicated at 18ᵈ is such as to closely fit within the central opening of the washer 8 so that when the device 18 is inserted through the central opening of the cover 14, the head which has a rounding end portion pushes the jaws 11 and 12 apart and as soon as the device has been pushed in sufficiently far these jaws 11 and 12 engage in the groove or channel 18ᶜ, being urged inwardly into close engagement by the spring 13. This engagement of the jaws with the recess or groove as described securely holds the coupling parts together and when in this condition if grease be forced through the flexible conduit 5, the packing 8 will prevent the grease from securing any exit except through the central opening 18ᵇ of the lubricant receiving device 18.

When a sufficient or desired amount of lubricant has been charged through the lubricant receiving device, the handle 3 may be turned slightly in the reverse direction thereby relieving pressure on the lubricant within the pressure 1 and for the purpose of releasing the jaws 11 and 12 from their engagement with the groove 18ᶜ, the member 17 is pushed inwardly, thus expanding the jaws 11 and 12 and permitting the two parts of the coupling to be separated.

Having described our invention, we claim—

1. A detachable coupling for conduit sections comprising interlocking plug and socket members at the ends of the sections to be joined, said socket member comprising an enlarged cup shaped end member, a packing member fitting in said cup shaped portion and projecting beyond the outer end thereof, said packing member having a central opening, a plate overlying the packing and supported thereby out of contact with said end member, a cap detachably secured upon said cup shaped end member, said plate and cap having central openings aligned with the opening in the packing member, a pair of clamping jaws pivoted to said plate and lying between the plate and cap, said jaws being positioned at opposite sides of the openings, and spring pressed toward clamping position, and means extending to the outside of the socket member for opening said jaws, said plug member being insertable into the socket member through the openings in the cap and plate and having an end portion adapted to fit within the opening in the packing and a circumferential groove adapted to receive the clamping jaws.

2. A detachable coupling for conduit sections, comprising interlocking plug and socket members at the ends of the sections to be joined, said socket member comprising an enlarged externally threaded end member having a cup shaped recess, a packing member fitting in the recess and projecting beyond the outer end of the end member, said packing member having a central opening, a cap adapted to be screwed on the end member, said cap having an opening aligned with the opening in the packing member, a plate overlying said packing member and having an opening aligned therewith, said plate being supported by the packing out of contact with the end member clamping means carried by the plate and lying between the plate and cap and an actuating member for said clamping means carried by the cap, said plate being unattached and free to rotate with the cap, said plug member being insertable into the socket through the openings in the cap and plate and having a recessed portion engaged by said clamping means.

In testimony whereof, we hereunto affix our signatures.

ERNEST L. FULLER.
ADELBERT E. BRONSON.